United States Patent [19]

Flanders et al.

[11] Patent Number: 4,690,644

[45] Date of Patent: Sep. 1, 1987

[54] TEACHING APPARATUS, PARTICULARLY FOR TEACHING SHORTHAND

[76] Inventors: Robert G. Flanders; Marguerita E. Flanders, both of Dico Education International, 247 Court Road, London, England, SE9 4TQ

[21] Appl. No.: 812,138

[22] Filed: Dec. 23, 1985

[51] Int. Cl.[4] .............................................. G09B 11/00
[52] U.S. Cl. ..................................... 434/158; 434/227
[58] Field of Search ......................... 434/227, 232, 158

[56] References Cited

U.S. PATENT DOCUMENTS 4,190,967  3/1980  Ruegg et al. ......................... 434/227
4,492,582  1/1985  Chang et al. ......................... 434/232

*Primary Examiner*—Leo P. Picard
*Attorney, Agent, or Firm*—Amster, Rothstein & Ebenstein

[57] ABSTRACT

An apparatus for use in teaching comprises a carrier (10,20) of information that is to form the subject-matter of a lesson; a keyboard (12) having its keys marked with symbols which include those related to the said information; a visual display unit (14) having a screen (15); a computer (13) which is programmed in relation to said information to check the accuracy of a student's transcription of at least part of the information by indicating on the screen and/or audibly, the performance of the student; the apparatus is intended for use in the largely automated teaching of typing, shorthand (Pitman, Gregg and Teeline), and also foreign languages.

1 Claim, 6 Drawing Figures

FIG. 3A

The Teeline 'y' is part of the handwritten [symbol].

It is larger than 'u',
and has a short stick on the side:- [symbol]
It represents the word YOUR.

When a word ends with 'nce', use a disjoined
small 'c' to show the 'nce' ending:- dance [symbol]   fence [symbol]   wince [symbol]

When 'ph' or 'gh' has the sound of 'f',
use a Teeline 'f':- enough [symbol]   phone [symbol]

New Words

| | | | | |
|---|---|---|---|---|
| blowing | [symbol] | chased | [symbol] | |
| getting | [symbol] | hiding | [symbol] | |
| is | [symbol] | living | [symbol] | |
| mining | [symbol] | must | [symbol] | me |
| passed | [symbol] | phone | [symbol] | |
| since | [symbol] | tell | [symbol] | |
| them | [symbol] | will | [symbol] | |
| yes | [symbol] | today | [symbol] | |

Special Outline somehow [symbol]   (The 'h' is omitted.)

Groupings

I-was [symbol]   must-be [symbol]
did not [symbol]   did you [symbol]

FIG. 3B

"I have been living in a mining camp since then. Today I came out this way for a walk. I was chased down here by a man with a rifle!"

"Did you not see the two men with the pony?" asked the girl.

"Yes. They passed me while I was hiding in a hole at the side of the road! They did not see me." replied Tom.

"But the man at the top will tell them you are down here! They will come down to look for you. And they can phone the two men from the gang who are down here. They are bound to get you!"

"Is there no way out of here?" he asked. "All the air that is blowing along this roadway. It must be getting out of the mine somehow."

```
"_____*_____._____._____ camp
_____._____Today _ came _____
for _____.___*_____._____ down
_____._____ rifle!"
"_____*_____._____._____
_____?" asked _____.
"_____._____*_____._____*_____
_____._____*_____." replied _____.
"_____*_____._____._____ down
_____ down _____:_____ come down
_____ for _____.___ can _____
_____*_____ gang _____ down _____.
_____ bound _____!"
"_____._____._____?" asked.
"_____*

FIG.4A

Here is the 'cn' blend ⌒. In it the 'n' is reversed, so that it begins with the 'c' stroke. It represents 'c (vowel) n'.

A disjoined 'n' written in the 't' position is used to show the 'tion' ending and any similarly sounded ending. A vowel may be added to this if required:- tion       ation

See Unit 25 for the disjoined 'c' ending (nce) and Unit 35 for the 'lr' blend.

A new blend used in this Unit is 'vn' -

Now study these words:- clear       fence
second      ventilation

Other New Words:- afford      hectic
blackness   hot
forked      I'd
fresh       realise

Special Outline

. knew      (See 'now', Unit 36.)

Groupings would-have      of-them
they-were       into-the

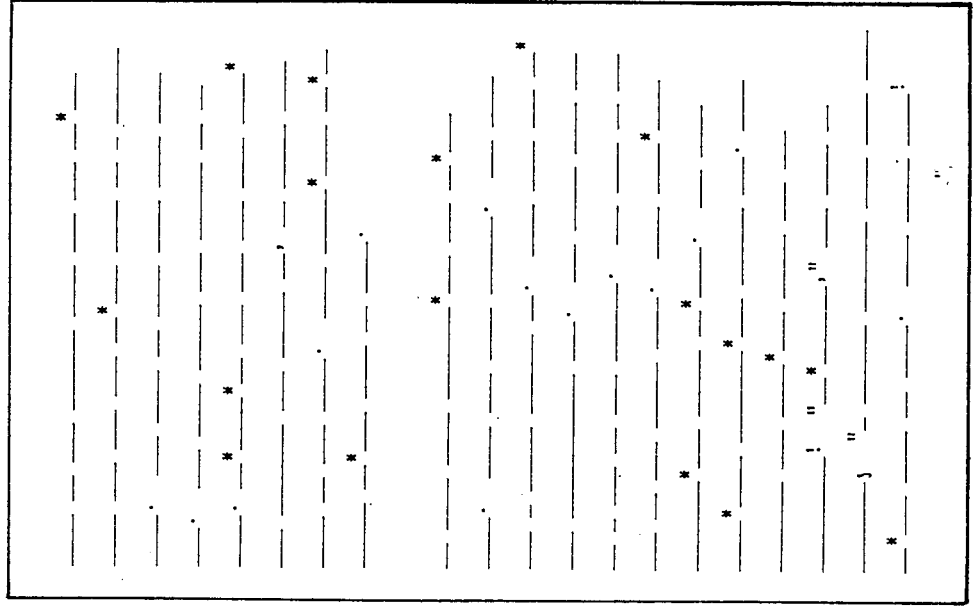

FIG. 4B

When he had passed they got out of the hole and set off up the hill at a hectic pace. The lack of wind made them very hot. But they could not afford to go slow. As soon as the man had seen that the roadway had caved in, he would come back to get help. They would have to be clear of the mine by then.

At last they reached the top of the hill. Here the road forked. One road had a fence across it. This road led to the ventilation fan. The other road led to a set of air doors. Tom knew by now how to get these open. Soon they were through the first of them. And then they were through the second set. They stepped out into the fresh air and blackness! "Of course," Tom said to himself. "I didn't realise that I'd been in the mine so long. It's night time!"

TEACHING APPARATUS, PARTICULARLY FOR TEACHING SHORTHAND

This invention relates to teaching apparatus and is particularly applicable to teaching of copy-typing, audio typing and shorthand.

Various methods of teaching typing and shorthand and speedwriting have previously been proposed, but most of these have lacked a satisfactorily simple and rapid means of checking the work and thus also the progress of the student. It is an object of the present invention to remove or at least reduce this particular disadvantage.

The term "teaching" used herein is intended to cover not only initial learning but also revision and practice by more advanced students.

According to the present invention there is provided an apparatus for use in teaching comprising:

a carrier of information that is to form the subject matter of a lesson;

a keyboard having its keys marked with symbols which include those related to the said information;

a visual display unit; and, a computer which is programmed in relation to said information to check the accuracy of a student's transcription of at least part of the information by indicating on the display unit and/or audibly the occurrence of an error made by the student.

The keyboard preferably has a layout as in a conventional typewriter or word-processor.

The carrier is a pad or like series of sheets printed with lines of wording or shorthand symbols to enable the accuracy of a student's copy-typing to be checked, or with lines of shorthand symbols to enable a student's transcription to be checked.

By means of the apparatus according to the invention, the student will be able to concentrate on the printed sheet, yet at the same time be made immediately aware of any mistakes that have been made.

Embodiments of the invention will now be described, by way of example, with reference to the accompanying drawings in which:

FIGS. 3A and 3B are copies selected from a series of sheets which form a progressive instruction pack;

FIGS. 4A and 4B are copies of sheets from a more advanced stage of the series.

Figure 1:
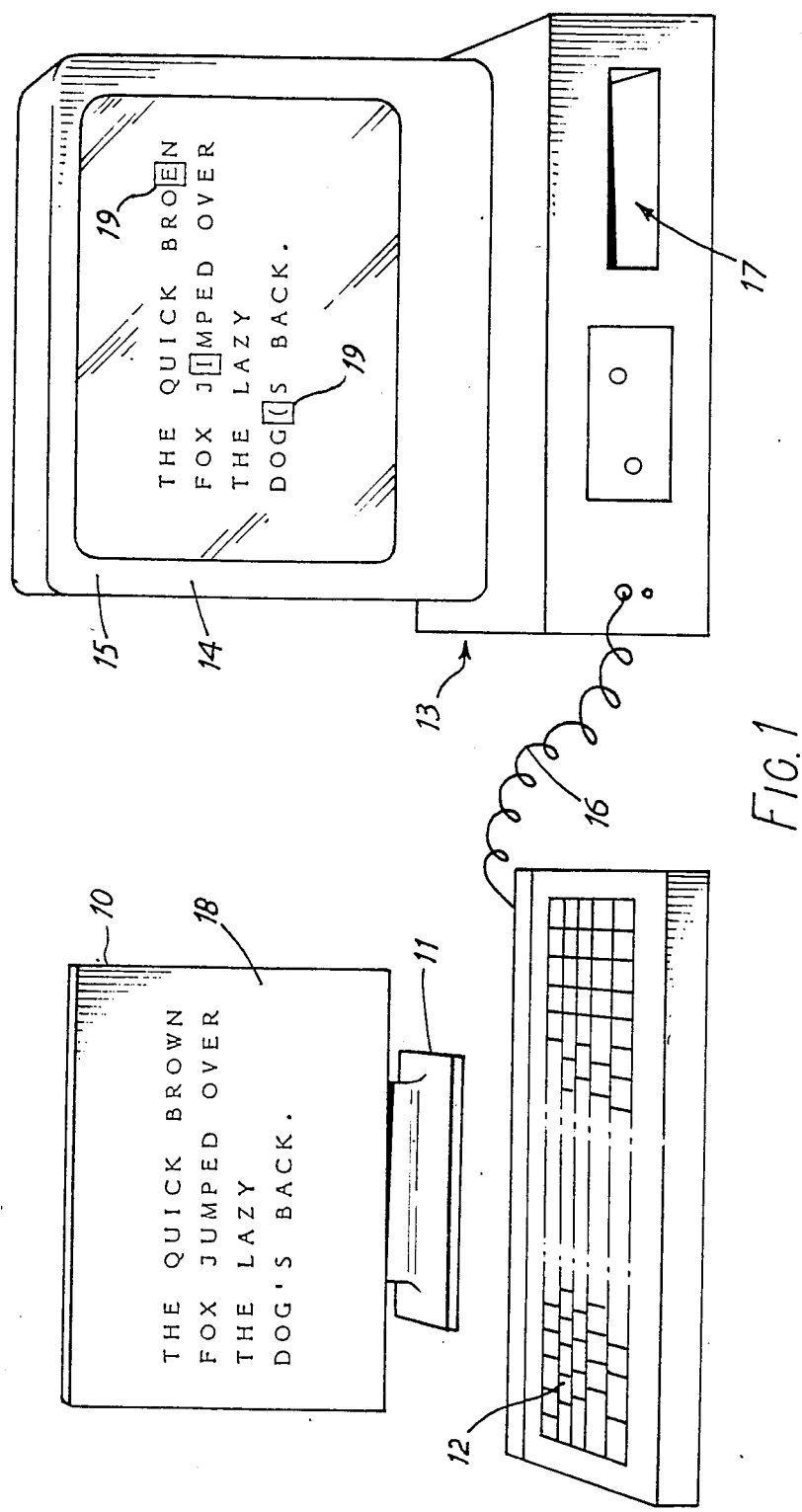
FIG. 1 is a diagrammatic drawing showing an in-use layout of an apparatus, according to the invention, for teaching copytyping.

Referring to FIG. 1 of the accompanying drawings, the teaching apparatus comprises a pad 10 mounted on a stand 11 for convenient viewing by a student, a keyboard 12 conveniently placed for operation by the student, a computer 13, and a visual display unit 14 having a screen 15 also placed for convenient viewing by the student.

The computer 13 which is connected to the keyboard 12 by a spiral cable 16, may be, for example, a BBC MICRO, a COMMODORE 64, or an IBM PC. The programme is carried in at least one floppy disc 17, with a programme written in BASIC.

The pad comprises a series of numbered, turnover pages 18, only one of which is shown. Alternatively, a spiral-bound book of pages or a stack of possibly loose-leaf sheets may be provided.

In use, a student reads the page 18, and types his version on the keyboard 12. His typed version appears on the screen as in a word-processor.

Various checking routines may be incorporated in the programme, such as will now be listed:

1. An error-check may be provided to generate a visual or audible signal to alert the student to a typed mistake in spelling or layout. For example, the error may be ringed or illuminated as indicated at 19, and/or a buzzer may sound.

2. A direct-comparison display of the correctly typed tet may be called-up to appear below or similarly adjacent the student's attempt displayed on the screen 15.

3. A printer (not showing) may be provided to produce the correct and the student's texts, alongside one another, possibly in different colours or type styles.

It will be appreciated that the sheets of the pad 10 carry "lessons" of increasing difficulty. Suitably, a number of pads may be provided for teaching typing for different contexts or professions, and each pad may be associated with its individual floppy disc 17.

In an alternative version, several programmes may be carried on one hard disc, and this concept is applicable to a system having a central (main-frame) computer and separate satellite stations or terminals.

Figure 2:
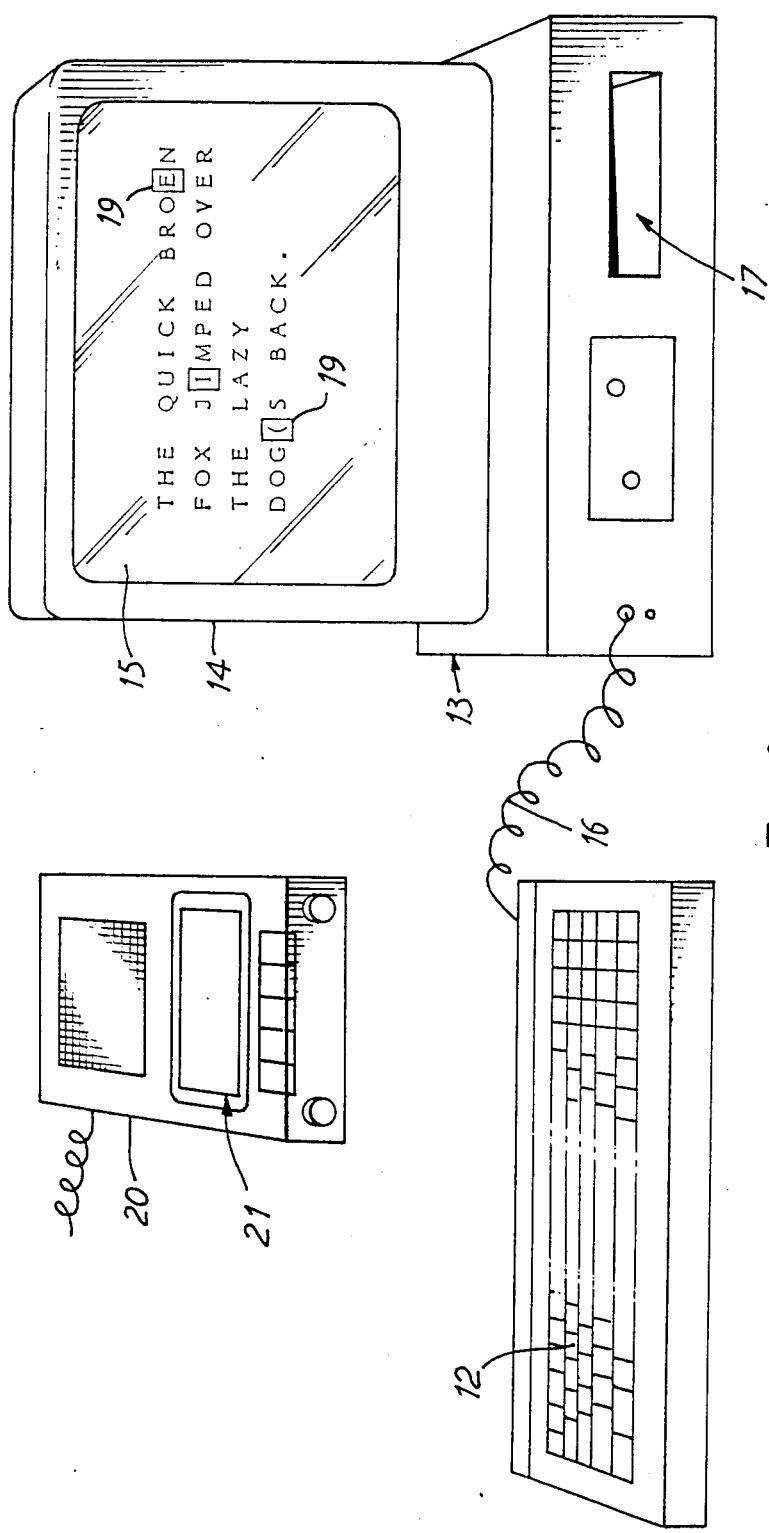
FIG. 2 is a diagrammatic drawing showing the layout of a similar apparatus for use in teaching audio typing, spelling and/or languages.

FIG. 2 shows an alternative embodiment where the pad (10) is replaced by a tape recorder 20. This apparatus is intended for teaching audio-typing, spelling and also languages, and is used in the manner similar to that for the apparatus of FIG. 1.

With the apparatus of FIG. 2, audio tapes 21 for various purposes are associated with floppy disc 17. For example, the tapes 21 may carry dictation for a copy-typist student, or words or phrases for a student of languages. As described with reference to FIG. 1, the student types his version of the taped words and his efforts are checked as in 1, 2 and 3 above. The tapes may be played through individual earphones or broadcast to a class.

FIGS. 3A/3B and 4A/4B each show two pairs of sheets for use in teaching shorthand. Sheets 30 to 34 of FIGS. 3A/3B represent an intermediate unit or lesson in a series of fifty, and sheets 40 to 43 of FIGS. 4A/4B represent a more advanced unit.

Sheet 30 of FIG. 3A gives an introduction to new shorthand characters or symbols, and these are first committed to memory by the student. The student then studies page 31 and, with the assistance of the occasional words printed on page 31 (and with page 32 covered), types his transcription into the keyboard. The student's text immediately appears on screen 15 and is monitored as described above. The screen 15 shows typing speed and error rate, in addition to errors being highlighted and/or indicated audibly. If the student's error rate is impracticably high, during initial attempts, he may refer to page 32 for correction.

Next, the student will turn to pages 32 and 33 and will write his shorthand version of page 32 in the largely-blank page 33. A check on accuracy can be made with reference to page 31, if desired.

In the final part of this lesson, the student will type in his transcription of his own shorthand, and his work will be checked as described above.

In an alternative. the student may proceed directly from page 30 to page 33 and type his transcription into the keyboard.

The student may repeat the lesson a number of times before progressing to a more difficult lesson as shown in FIGS. 4A and 4B.

Referring to FIGS. 4A and 4B, page 40 illustrates more difficult symbols to be utilized with the blank page 41 which does not include any helpful wording. Pages 42 and 43 correspond to pages 32 and 33, respectively.

It will be appreciated that the apparatus of the present invention is adaptable to individual or group teaching of various subjects, either by micro or mainframe computers, by substituting correlated pads/tapes with floppy or hard discs carrying the appropriate programmes. The students have the advantage of immediate feed-back and correction, and the systems can be adapted not only to individual speeds, but also to determine and compare individual accuracy, speed and general progress.

We claim:
1. An apparatus for use in teaching, comprising: a series set of printed sheets carrying information for use in teaching shorthand each set including a lesson page, a page printed with text, a page printed with a shorthand version of said text, and at least a partially blank sheet wherein each set is progressively more difficult;
   a keyboard having its keys marked with symbols which include those related to the said shorthand teaching sheets;
   a computer; and
   program means in said computer, to program the computer in relation to said information to check the accuracy of a student's transcription of at least part of the information by indicating the performance of the student.

* * * * *